US 9,536,374 B2

(12) United States Patent
Manning et al.

(10) Patent No.: US 9,536,374 B2
(45) Date of Patent: *Jan. 3, 2017

(54) INTEGRATING THREE-DIMENSIONAL ELEMENTS INTO GAMING ENVIRONMENTS

(71) Applicant: Bally Gaming, Inc., Las Vegas, NV (US)

(72) Inventors: Brian D. Manning, Las Vegas, NV (US); Scott A. Massing, Lincolnwood, IL (US); Alfred Thomas, Las Vegas, NV (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,434

(22) Filed: Oct. 22, 2015

(65) Prior Publication Data
US 2016/0042589 A1 Feb. 11, 2016

Related U.S. Application Data

(63) Continuation of application No. 13/822,621, filed as application No. PCT/US2011/060497 on Nov. 12, 2011, now Pat. No. 9,168,454.
(Continued)

(51) Int. Cl.
*G07F 17/32* (2006.01)
*A63F 13/00* (2014.01)
*A63F 13/58* (2014.01)

(52) U.S. Cl.
CPC ............. *G07F 17/32* (2013.01); *A63F 13/00* (2013.01); *G07F 17/3211* (2013.01);
(Continued)

(58) Field of Classification Search
CPC .................. A63F 13/10; G07F 17/32
See application file for complete search history.

(56) References Cited

U.S. PATENT DOCUMENTS 6,089,977 A 7/2000 Bennett
6,887,157 B2 5/2005 LeMay et al.
(Continued)

FOREIGN PATENT DOCUMENTS

EP 0727245 9/1996
EP 2082381 7/2009
(Continued)

OTHER PUBLICATIONS

"PCT Application No. PCT/US11/60497 International Preliminary Report on Patentability", Jan. 11, 2013, 4 pages.
(Continued)

Primary Examiner — Omkar Deodhar
(74) Attorney, Agent, or Firm — DeLizio Law, PLLC

(57) ABSTRACT

A wagering game system and its operations can include presenting wagering game content for a casino wagering game to have a two-dimensional appearance via an autostereoscopic display device. The operations can further include detecting an indication to change a presentation of the two-dimensional appearance without stereoscopic depth to have a stereoscopic three-dimensional appearance having stereoscopic depth. The operations can further include detecting a game condition for the casino wagering game, determining a degree of stereoscopic three-dimensional depth to use for the wagering game content based on a value for the game condition, and changing the presentation of the two-dimensional appearance to the stereoscopic three-dimensional appearance in response to determining the degree of the stereoscopic three-dimensional depth to use. The operations can further include presenting, via the autostereoscopic display device, the wagering game content with
(Continued)

the degree of stereoscopic three-dimensional depth proportional to the value for the game condition.

22 Claims, 11 Drawing Sheets

Related U.S. Application Data

(60) Provisional application No. 61/412,914, filed on Nov. 12, 2010.

(52) U.S. Cl.
CPC ...... *G07F 17/3237* (2013.01); *G07F 17/3286* (2013.01); *A63F 13/58* (2014.09)

(56) References Cited

U.S. PATENT DOCUMENTS

| | | |
|---|---|---|
| 6,908,381 B2 | 6/2005 | Ellis |
| 7,128,647 B2 | 10/2006 | Muir |
| 7,311,607 B2 | 12/2007 | Tedsen et al. |
| 7,367,885 B2 | 5/2008 | Escalera et al. |
| 7,841,944 B2 | 11/2010 | Wells |
| 7,857,700 B2 | 12/2010 | Wilder et al. |
| 7,874,900 B2 | 1/2011 | Ward et al. |
| 7,878,910 B2 | 2/2011 | Wells |
| 7,909,696 B2 | 3/2011 | Beaulieu et al. |
| 7,918,730 B2 | 4/2011 | Brosnan et al. |
| 7,951,001 B2 | 5/2011 | Wells |
| 8,002,623 B2 | 8/2011 | Resnick et al. |
| 8,029,350 B2 | 10/2011 | Pacey |
| 8,077,195 B2 | 12/2011 | Grobmann |
| 8,096,878 B2 | 1/2012 | Durham et al. |
| 8,118,674 B2 | 2/2012 | Burak et al. |
| 8,182,339 B2 | 5/2012 | Anderson et al. |
| 8,210,922 B2 | 7/2012 | Williams et al. |
| 8,267,767 B2 | 9/2012 | Kryuchkov et al. |
| 8,384,710 B2 | 2/2013 | Schlottmann et al. |
| 8,454,428 B2 | 6/2013 | Pacey et al. |
| 8,628,399 B2 | 1/2014 | Aoki et al. |
| 8,628,415 B2 | 1/2014 | Johnson et al. |
| 8,690,671 B2 | 4/2014 | Kaufman |
| 8,715,055 B2 | 5/2014 | Dixon |
| 8,721,427 B2 | 5/2014 | Kelly et al. |
| 8,784,206 B1 | 7/2014 | Gronkowski et al. |
| 8,968,092 B2 | 3/2015 | Gomez et al. |
| 8,979,634 B2 | 3/2015 | Pacey et al. |
| 9,007,367 B2 | 4/2015 | Aponte et al. |
| 9,128,293 B2 | 9/2015 | Ohta |
| 9,168,454 B2 | 10/2015 | Manning et al. |
| 2004/0077401 A1 | 4/2004 | Schlottmann |
| 2004/0077404 A1 | 4/2004 | Schlottmann et al. |
| 2004/0192430 A1 | 9/2004 | Burak et al. |
| 2005/0037843 A1 | 2/2005 | Wells et al. |
| 2005/0288092 A1 | 12/2005 | Ellis |
| 2006/0148553 A1 | 7/2006 | Dodge |
| 2007/0041095 A1 | 2/2007 | Nakaya et al. |
| 2007/0117626 A1 | 5/2007 | Castellari |
| 2007/0281780 A1 | 12/2007 | Aida |
| 2008/0108413 A1 | 5/2008 | Gelber et al. |
| 2008/0113745 A1 | 5/2008 | Williams et al. |
| 2008/0194320 A1 | 8/2008 | Walsh et al. |
| 2008/0220850 A1 | 9/2008 | Pacey |
| 2009/0181755 A1 | 7/2009 | Gagner et al. |
| 2009/0181769 A1 | 7/2009 | Thomas et al. |
| 2009/0291731 A1 | 11/2009 | Jaffe et al. |
| 2009/0298568 A1 | 12/2009 | Pacey et al. |
| 2010/0234094 A1 | 9/2010 | Gagner et al. |
| 2010/0279755 A1 | 11/2010 | Pacey et al. |
| 2011/0045891 A1 | 2/2011 | Ansari et al. |
| 2011/0115880 A1 | 5/2011 | Yoo et al. |
| 2011/0201404 A1 | 8/2011 | Wells |
| 2011/0256921 A1 | 10/2011 | Pacey et al. |
| 2012/0172119 A1 | 7/2012 | Kelly et al. |
| 2013/0165205 A1 | 6/2013 | Collette et al. |
| 2013/0184064 A1 | 7/2013 | Manning et al. |
| 2013/0267317 A1 | 10/2013 | Aoki et al. |
| 2013/0331184 A1 | 12/2013 | Kelly et al. |
| 2014/0066178 A1 | 3/2014 | Kelly |
| 2014/0073386 A1 | 3/2014 | Aoki et al. |
| 2014/0121015 A1 | 5/2014 | Massing et al. |
| 2014/0235342 A1 | 8/2014 | Kelly et al. |
| 2014/0235343 A1 | 8/2014 | Kelly et al. |
| 2014/0235344 A1 | 8/2014 | Kelly et al. |
| 2014/0235345 A1 | 8/2014 | Kelly et al. |
| 2014/0295970 A1 | 10/2014 | Gronkowski et al. |
| 2015/0024846 A1 | 1/2015 | Gomez et al. |
| 2015/0213675 A1 | 7/2015 | Aponte et al. |
| 2016/0110948 A1 | 4/2016 | Collette et al. |
| 2016/0110949 A1 | 4/2016 | Collette et al. |
| 2016/0110950 A1 | 4/2016 | Collette et al. |

FOREIGN PATENT DOCUMENTS

| | | |
|---|---|---|
| WO | 2006039257 | 4/2006 |
| WO | 2006039324 | 4/2006 |
| WO | 2006039348 | 4/2006 |
| WO | 2006039371 | 4/2006 |
| WO | 2007021559 | 2/2007 |
| WO | 2007021560 | 2/2007 |
| WO | 2007032878 | 3/2007 |
| WO | 2008079542 | 7/2008 |
| WO | 2012056636 | 3/2012 |
| WO | 2012065146 | 5/2012 |

OTHER PUBLICATIONS

"PCT Application No. PCT/US11/60497 International Search Report", May 25, 2012, 9 pages.
"U.S. Appl. No. 13/822,621 Office Action", Jan. 22, 2015, 7 Pages.
"U.S. Appl. No. 13/722,468 Final Office Action", Jul. 15, 2016, 26 pages.
"U.S. Appl. No. 13/722,468 Office Action", Jan. 12, 2016, 21 pages.
"U.S. Appl. No. 14/977,223 Office Action", Jul. 5, 2016, 20 pages.
"U.S. Appl. No. 14/977,245 Office Action", Jul. 1, 2016, 17 pages.
Co-Pending U.S. Appl. No. 13/722,468, filed Dec. 20, 2012, 51 pages.
Co-Pending U.S. Appl. No. 14/977,223, filed Dec. 21, 2015, 48 pages.
Co-Pending U.S. Appl. No. 14/977,233, filed Dec. 21, 2015, 50 pages.
Co-Pending U.S. Appl. No. 14/977,245, filed Dec. 21, 2015, 49 pages.

(FRONT VIEW AS VIEWED VIA ACTIVE 3D VIEWER)

(TOP VIEW)

(SIDE VIEW)

INTEGRATING THREE-DIMENSIONAL ELEMENTS INTO GAMING ENVIRONMENTS

RELATED APPLICATIONS

This application is a continuation of, and claims priority benefit of, U.S. application Ser. No. 13/822,621 which is a National Stage Application of PCT/US2011/060497 filed Nov. 12, 2011, which claims priority benefit of Provisional U.S. Application No. 61/412,914 filed Nov. 12, 2010. The Ser. No. 13/822,621 application, the PCT/US2011/060497 Application, and the 61/412,914 Application are each incorporated herein by reference in their respective entireties.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, Bally Gaming, Inc.

TECHNICAL FIELD

Embodiments of the inventive subject matter relate generally to wagering game systems and networks that, more particularly, integrate three-dimensional elements into gaming environments.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operating environments while the third section describes example operations performed by some embodiments. The fourth section describes additional example operating environments while the sixth section presents some general comments.

Introduction

This section provides an introduction to some embodiments.

Wagering games are expanding in popularity. Wagering game enthusiasts expect continuous innovations to the wagering game experience. As stated previously, wagering game companies are interested in creating and providing innovate wagering games and gaming features to the demanding public. Three-dimensional (3D) presentation technologies have captivated the interest of the entertainment industry for years. The gaming industry can also benefit from 3D presentation technologies in innovative ways. Some embodiments of the present inventive subject matter present first portions of wagering game content using two-dimensional (2D) presentation techniques while simultaneously presenting second portions of the wagering game content using 3D presentation techniques. The second portions appear to have the perception of binocular stereoscopic depth. Some embodiments further present the 2D and 3D wagering game content from the perspectives of multiple casino patrons at the same time, including from the perspectives of multiple players at an electronic game table ("e-table") or from the perspectives of audience members watching players play a 3D enabled wagering game. Some embodiments automatically toggle between 2D and 3D modes based on specific conditions, such as game conditions, environmental factors, player information, etc.

Figure 1:
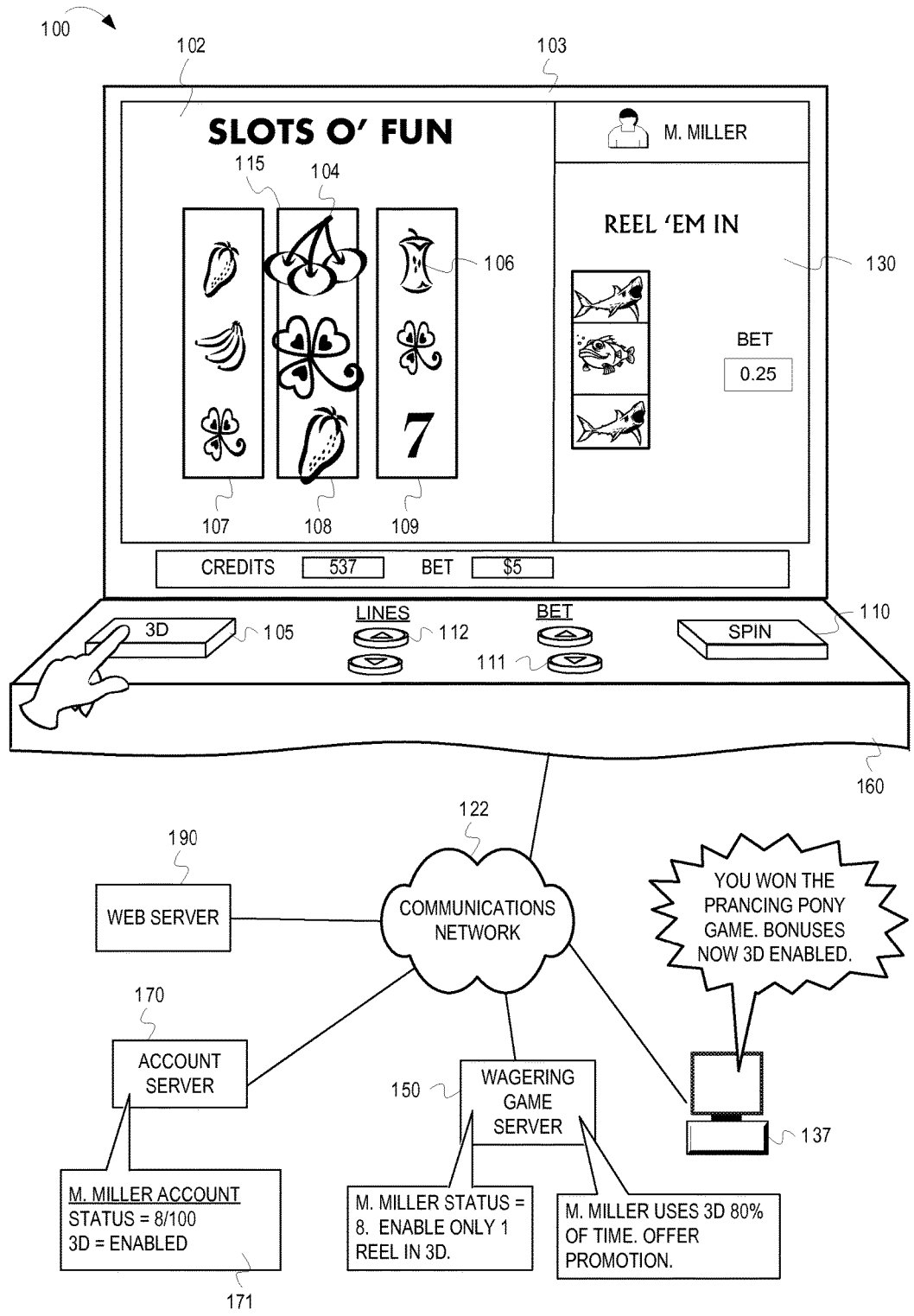
FIG. 1 is an illustration of toggling between 3D and 2D mode in response to gaming conditions and player information, according to some embodiments.

FIG. 1 is a conceptual diagram that illustrates an example of toggling between 3D and 2D mode in response to gaming conditions and player information, according to some embodiments. In FIG. 1, a wagering game system ("system") 100 includes a wagering game machine 160, a wagering game server 150, an account server 170, a web server 190, and a computer 137 connected via a communications network 122. The wagering game machine 160 can receive an indication from a player, a game, a device, or any other source, to toggle a wagering game from a 2D mode to a 3D mode and vice versa. For example, the wagering game machine 160 includes a display 103 that presents one of more wagering games, such as a primary wagering game 102 and a secondary wagering game 130. The primary wagering game 102 and the secondary wagering game 130 are wagering game applications that are controlled by the wagering game machine 160 and/or the wagering game server 150. For example, the primary wagering game 102 may be a wagering game application installed and stored on memory of the wagering game machine 160. The secondary wagering game 130 may be a server-side application controlled by the wagering game server 150 and the wagering game machine 160 as a thin client via the communications network 122. The wagering game machine 160 may include several controls, such as a spin control 110, betting controls 111, controls 112 for setting a number of pay lines, and a 3D toggle control 105 to toggle 3D presentations on and off for elements presented on the display 103, such as the presentation of 3D wagering game elements on the slot reels 107, 108 or 109. As an example, the system 100 can detect when a player pushes the 3D toggle button 105. The system 100 can then modify the presentation of one or more of the wagering game elements on the slot reel 108 to be 3D. For instance, the display 103 may be enabled to present in both 2D and 3D modes simultaneously. After detecting activation of the 3D toggle button 105, the system 100 presents some of the wagering game elements in 3D. For instance, the system 100 presents the wagering game element 104, and other elements of reel 108, in 3D mode. In 3D mode, the wagering game element 104 appears to hover above the display 103 in a binocular stereoscopic effect, extend beyond a boundary 115 of the reel 108, or express any other 3D effect. The system 100 can simultaneously present some of the wagering game elements in 2D (e.g., present the wagering game element 106, and other elements of reels 107 and 109 in 2D).

The system 100 can determine which of the wagering game elements to present in 3D based on specific conditions, such as game conditions, environmental factors, player information, etc. For instance, the account server 170 stores a player account 171 associated with a player (e.g., M. Miller). The system 100 can check a status for the player indicated in the player account 171 (e.g., determine that the player M. Miller has a status level of "8" out of a possible "100.") Given the player's status, the system 100 can determine a degree of 3D presentation to provide (e.g., wagering game server 150 detects the level of "8" for the player's status and enables 3D for only reel 108 after the 3D toggle button 105 is activated). In some embodiments, the system 100 can check player information for various accounts, such as accounts on game websites, social networks, other casino accounts, etc. Based on the player information for the various accounts, the system 100 can update the status of the player account 171, causing an increase to a degree of 3D presentation (e.g., increase a number of gaming elements that appear in 3D as mentioned above, increase a degree of parallax of a 3D effect increasing a depth of the effect, etc.). For example, the player may log on to a game website via the computer 137 from home, win a non-wagering game on the website, and the website communicates the win to the account server 170. The account server 170 updates the player status and communicates the update to the web server 190. The web server 190 then sends a message to the computer 137 indicating that the player has unlocked a new 3D feature (e.g., 3D bonuses). The next time that the player returns to a casino, the wagering game machine 160 can present bonuses in 3D when the player activates the 3D toggle button 105. Further, in some embodiments, the system 100 can track data regarding an amount of 3D usage by a player (e.g., an amount of time the 3D toggle button 105 is pressed, an amount of time that 3D content is displayed, etc.) and use the data to change user settings (e.g., automatically update a user's default preferences), offer promotions (e.g., present specific advertisements in 3D, offer first choice of new games in 3D, provide tickets to 3D shows, etc.), incentivize the player to perform additional activity (e.g., offer to customize a player's display further with 3D for entering a tournament or clicking an advertisement, offer to present an additional degree of 3D for recruiting other players to play a group game, etc.), etc. In some embodiments, the system 100 can also use the data to provide a player with 3D enabled hardware and software (e.g., to initiate a gift of 3D glasses, to reserve 3D enabled wagering game machines, to provide a mobile phone 3D screen enhancer or application, etc.), which the player can use in a casino or away from the casino for presenting and viewing 3D content.

The system 100, and other embodiments described below, may utilize different 3D techniques and devices to present the perception of 3D. Some of those techniques and devices include, but are not limited to, the following: anaglyph images, polarized projections, autostereoscopic displays, computer-generated holography, volumetric displays, infrared laser projections, side-by-side viewing, autostereograms, pulfrich effects, prismatic & self-masking crossview glasses, lenticular prints, displays with filter arrays, wiggle stereoscopy, active 3D viewers (e.g., liquid crystal shutter glasses, red eye shutterglasses, virtual reality headsets, personal media viewers, etc.), passive 3D viewers (e.g., linearly polarized glasses, circularly polarized glasses, interference filter technology glasses, complementary color anaglyphs, compensating diopter glasses for red-cyan method, Color-Code 3D, ChromaDepth method and glasses, Anachrome "compatible" color anaglyph method, etc.), 3D televisions, etc.

Anaglyph images, for example, are used to provide a stereoscopic 3D effect when viewed with glasses where the two lenses are different (usually chromatically opposite) colors, such as red and cyan. The anaglyph images are made up of two color layers (one for each eye), superimposed, but offset with respect to each other to produce a depth effect when viewed through the glasses. Usually the main subject is in the center, while the foreground and background are shifted laterally in opposite directions. When the two color layers are viewed simultaneously through the anaglyph glasses, an integrated stereoscopic image appears. The visual cortex of the brain fuses the two images into the perception of a three dimensional scene or composition.

In another example, polarized 3D glasses create the illusion of three-dimensional images by restricting the light that reaches each eye, an example of stereoscopy which exploits the polarization of light. To present a stereoscopic video, two images are projected superimposed onto the same screen through different polarizing filters. The viewer wears eyeglasses which also contain a pair of different polarizing filters. Each of the viewer's eyes sees a different image as each filter passes only that light which is similarly polarized and blocks the light polarized in the opposite direction. The use of the polarized 3D glasses thus produces a three-dimensional effect by projecting the same scene into both the viewer's eyes, but depicted from slightly different perspectives. Since no head tracking is involved, several people can view the stereoscopic images at the same time.

In another example, autostereoscopic displays use optical trickery at the display, rather than worn by the user, to ensure that each eye sees the appropriate image. Autostereoscopic displays generally allow the user to move their head a certain amount without destroying the illusion of depth.

In another example, automultiscopic displays include view-dependent pixels with different intensities and colors based on the viewing angle (i.e., a number of different views of the same scene can be seen by moving horizontally around the display). In most automultiscopic displays the change of view is accompanied by the breakdown of the illusion of depth, but some displays exist which can maintain the illusion as the view changes.

In another example, computer-generated holography utilizes devices that create a light field identical to that which would emanate from an original scene, with both horizontal and vertical parallax across a large range of viewing angles.

Volumetric displays are yet another example, where some physical mechanism is used to display points of light within a volume. Such displays use voxels instead of pixels. Volumetric displays include multiplanar displays, which have multiple display planes stacked up, and rotating panel displays, where a rotating panel sweeps out a volume.

Other technologies, for example, may include projecting light dots in the air above a device. An infrared laser is focused on the destination in space, generating a small bubble of plasma which emits visible light.

Further, some embodiments of the inventive subject matter can integrate three-dimensional elements into two-dimensional gaming environments in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
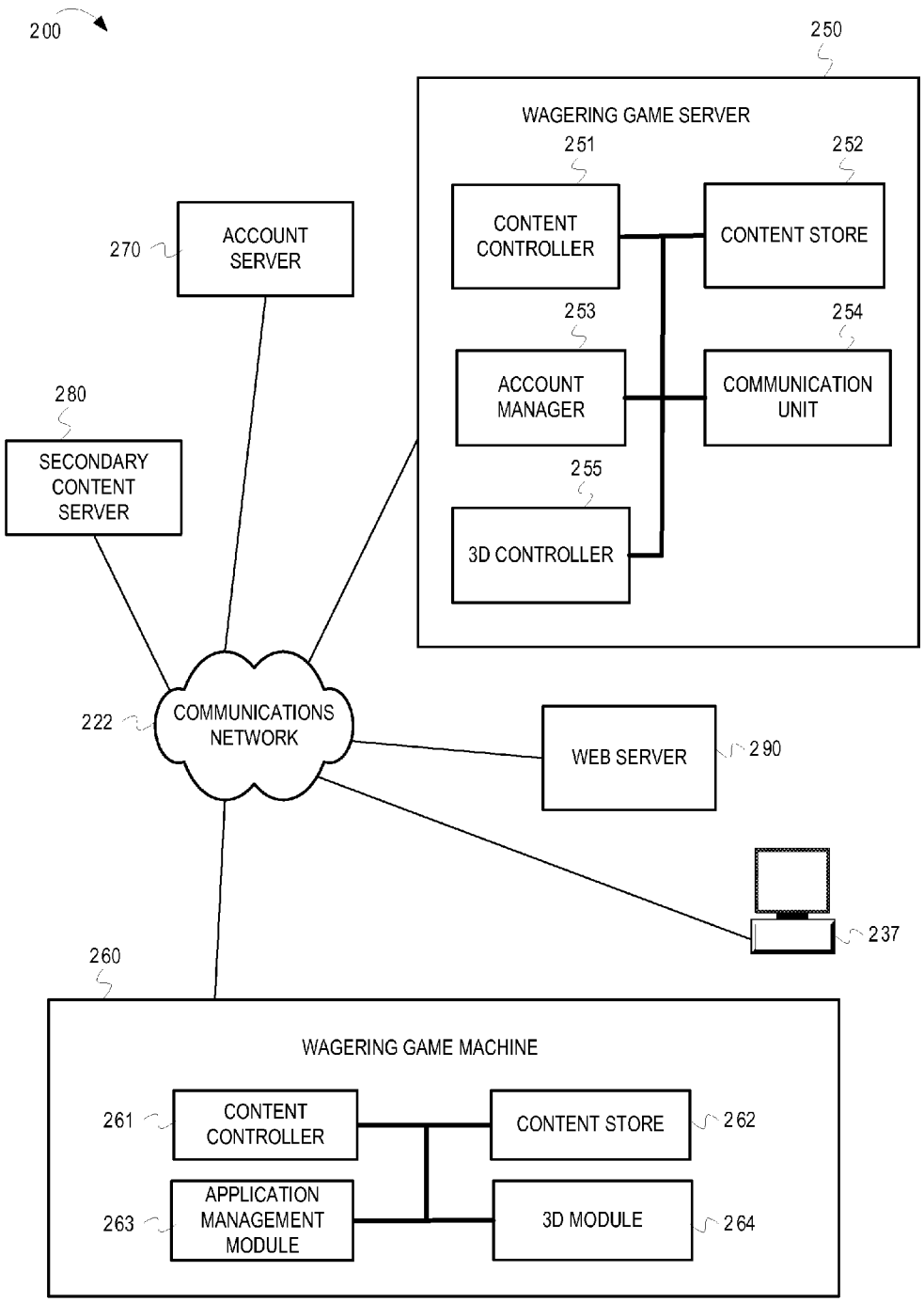
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networking networks. The account server 270 can store wagering game player account information, such as account settings (e.g., settings related to default enablement of 3D modes, settings related to a type of 3D technology to use to present 3D, settings related to parallax, settings related to social contacts, etc.), preferences (e.g., player preferences 3D presentation), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, and other information to and from the wagering game machine 260. The wagering game server 250 can include a content controller 251 configured to manage and control content for presentation on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include a 3D controller 255 configured to integrate 3D wagering game elements in 2D gaming environments in customized ways for players and audience members using various 3D presentation devices and 3D viewing devices (e.g., active viewers, passive viewers, etc.). The 3D controller is also configured to automatically toggle between 3D and 2D modes based on a variety of factors including, but not limited to game programming, network conditions, environmental conditions, device activation, and player information (e.g., player movements and location, player input, player status, player preferences, player performance, etc.). Because the wagering game server 250 includes a 3D controller, 3D content and 3D effects can be distributed to a number of wagering game machines in a casino at the same time.

The wagering game system architecture 200 can also include a wagering game machine 260 configured to present wagering games and receive and transmit information to coordinate, present, and control presentation of 3D elements in 2D gaming environments according to some embodiments. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include an application management module 263 configured to manage multiple instances of gaming applications. For example, the application management module 263 can be configured to launch, load, unload and control applications and instances of applications. The application management module 263 can launch different software players (e.g., a Microsoft® Silverlight™ Player, an Adobe® Flash® Player, etc.) and manage, coordinate, and prioritize what the software players do. The application management module 263 can also coordinate instances of the server applications in addition to local copies of applications. The application management module 263 can control window locations on a wagering game screen or display for the multiple gaming applications. In some embodiments, the application management module 263 can manage window locations on multiple displays including displays on devices associated with and/or external to the wagering game machine 260 (e.g., a top display and a bottom display on the wagering game machine 260, a peripheral device connected to the wagering game machine 260, a mobile device connected to the wagering game machine 260, etc.). The application management module 263 can manage priority or precedence of client applications that compete for the same display area. For instance, the application management module 263 can determine each client application's precedence. The precedence may be static (i.e. set only when the client application first launches or connects) or dynamic. The applications may provide precedence values to the application management module 263, which the application management module 263 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 263 of its current presentation state. The applications may provide presentation state values to the application management module 263, which the application management module 263 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 263 can be pre-configurable. The system can provide controls and interfaces for operators to control screen layouts and other presentation features for the configuring the application management module 263. The application management module 263 can communicate with, and/or be a communication mechanism for, a base game stored on a wagering game machine. For example, the application management module 263 can communicate events from the base game such as the base game state, pay line status, bet amount status, etc. The application management module 263 can also provide events that assist and/or restrict the base game, such as providing bet amounts from secondary gaming applications, inhibiting play based on gaming event priority, etc. The application management module 263 can also communicate some (or all) financial information between the base game and other applications including amounts wagered, amounts won, base game outcomes, etc. The application management module 263 can also communicate pay table information such as possible outcomes, bonus frequency, etc.

In some embodiments, the application management module 263 can control different types of applications. For example, the application management module 263 can perform rendering operations for presenting applications of varying platforms, formats, environments, programming languages, etc. For example, the application management module 263 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 263 can include a portable virtual machine capable of generating and executing code for the varying platforms, formats, environments, programming languages, etc. The application management module 263 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 260 can also include a 3D module 264 configured to integrate 3D wagering game elements in 2D gaming environments in customized ways for players and audience members using various 3D presentation devices and 3D viewing devices (e.g., active viewers, passive viewers, etc.). The 3D controller is also configured to automatically toggle between 3D and 2D modes based on a variety of factors including, but not limited to, game programming, network conditions, environmental conditions, device activation, and player information (e.g., player movements and location, player input, player status, player preferences, player performance, etc.).

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 280 can provide and control content for community games, including networked games, social games, competitive games, or any other game that multiple players can participate in at the same time. In some embodiments, the secondary content server 280 can control and present an online website that hosts wagering games. The secondary content server 280 can also be configured to present multiple wagering game applications on the wagering game machine 260 via a wagering game website, or other gaming-type venue accessible via the Internet. The secondary content server 280 can host an online wagering website and/or a social networking website. The secondary content server 280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 280 can also be configured to integrate 3D wagering game elements in 2D gaming environments. In some embodiments, the secondary content server 280 can also host social networking accounts, provide social networking content, control social networking communications, store associated social contacts, etc. The secondary content server 280 can also provide chat functionality for a social networking website, a chat application, or any other social networking communications mechanism. In some embodiments, the secondary content server 280 can utilize player data to determine marketing promotions that may be of interest to a player account. The secondary content server 280 can also analyze player data and generate analytics for players, group players into demographics, integrate with third party marketing services and devices, etc. The secondary content server 280 can also provide player data to third parties that can use the player data for marketing.

The wagering game system architecture 200 can also include a web server 290 configured to control and present an online website that hosts wagering games. The web server 280 can also be configured to present multiple wagering game applications on the wagering game machine 260 and/or the compute 237 via a wagering game website, or other gaming-type venue accessible via the Internet. The web server 280 can host an online wagering website and/or a social networking website. The web server 280 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.).

Each component shown in the wagering game system architecture 200 is shown as a separate and distinct element connected via a communications network 222. However, some functions performed by one component could be performed by other components. For example, the wagering game server 250 can also be configured to perform functions of the application management module 263, the 3D module 264, the secondary content server 280, the account server 270, the web server 290, and other network elements and/or system devices. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bartop models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
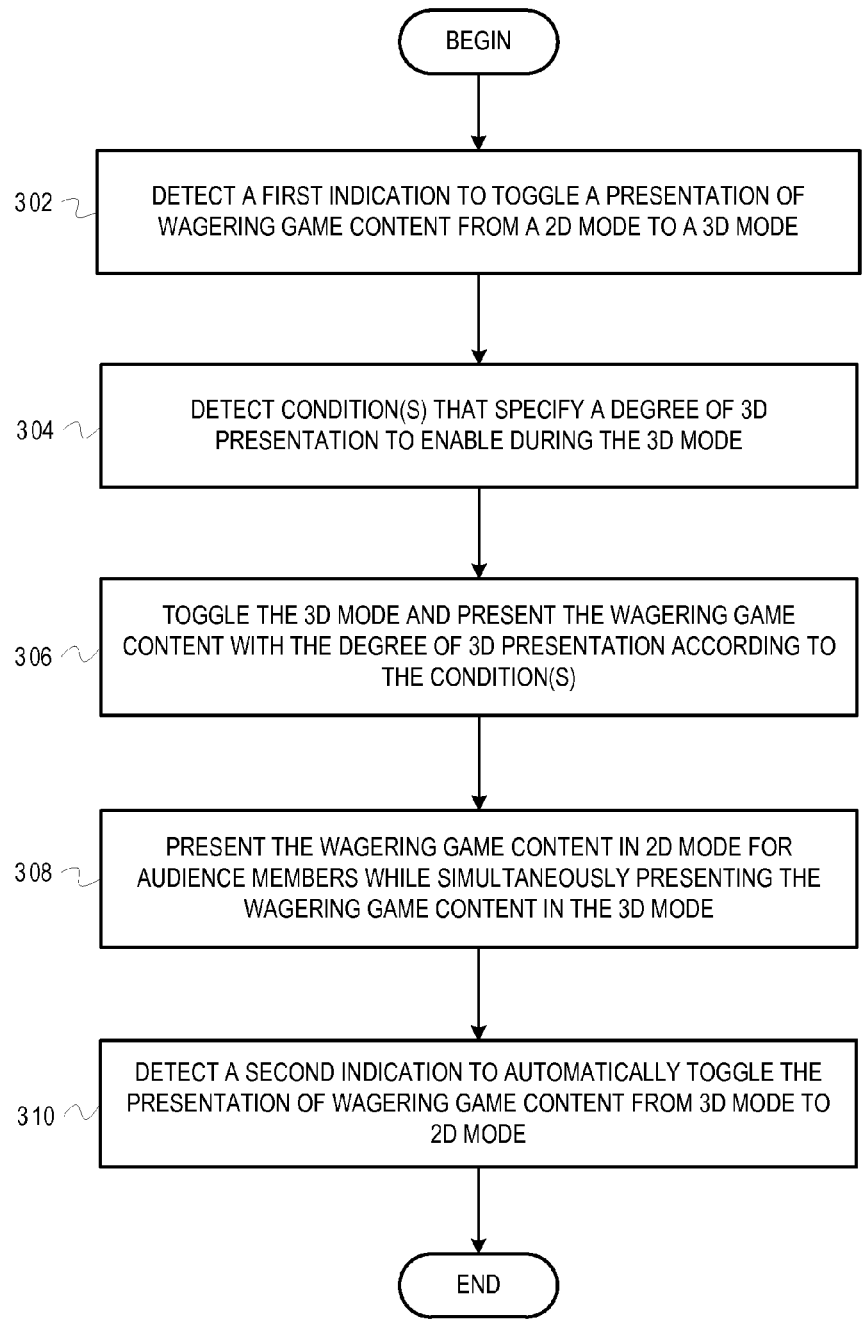
FIG. 3 is a flow diagram 300 illustrating toggling between 3D and 2D mode in response to gaming conditions and player information and integrating 3D wagering game elements in 2D gaming environments, according to some embodiments.
Figure 4:
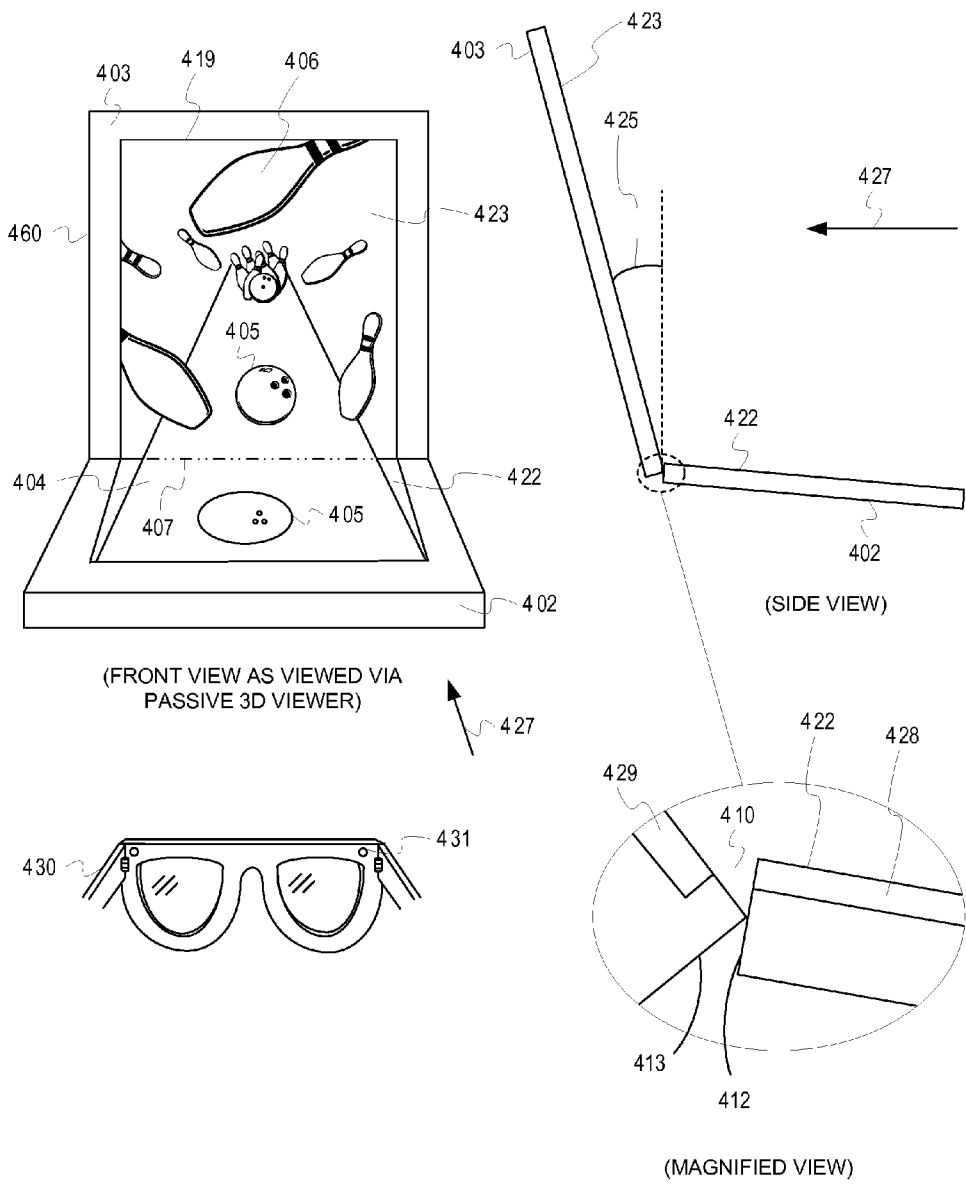
FIG. 4 is an illustration of integrating 3D wagering game elements in 2D gaming environments, according to some embodiments.
Figure 5:
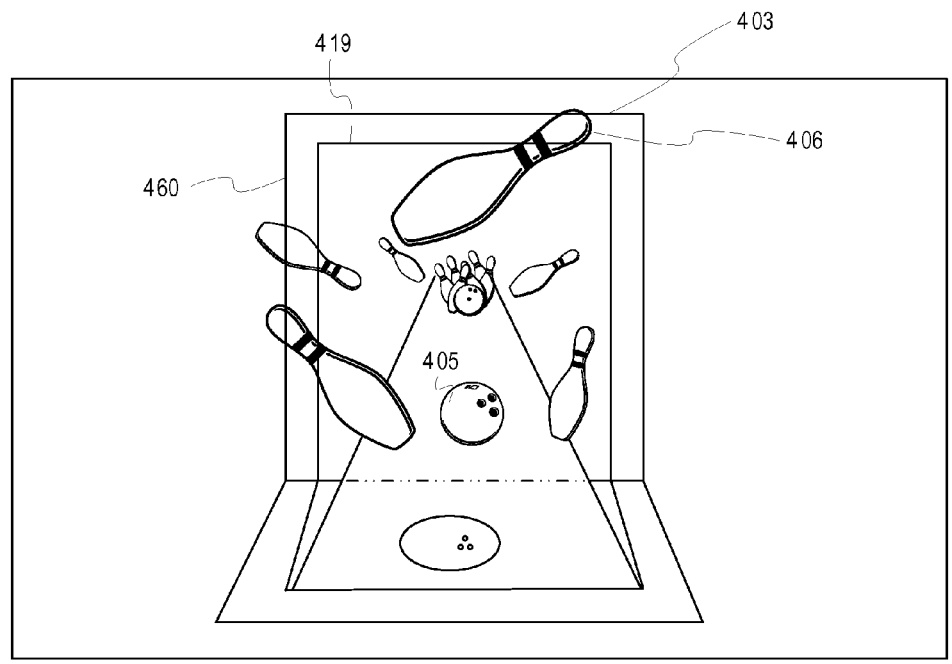
FIG. 5 is an illustration of integrating 3D wagering game elements in 2D gaming environments, according to some embodiments.
Figure 5:
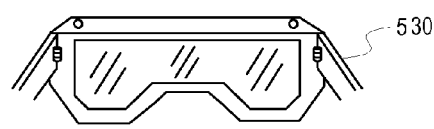
Figure 6:
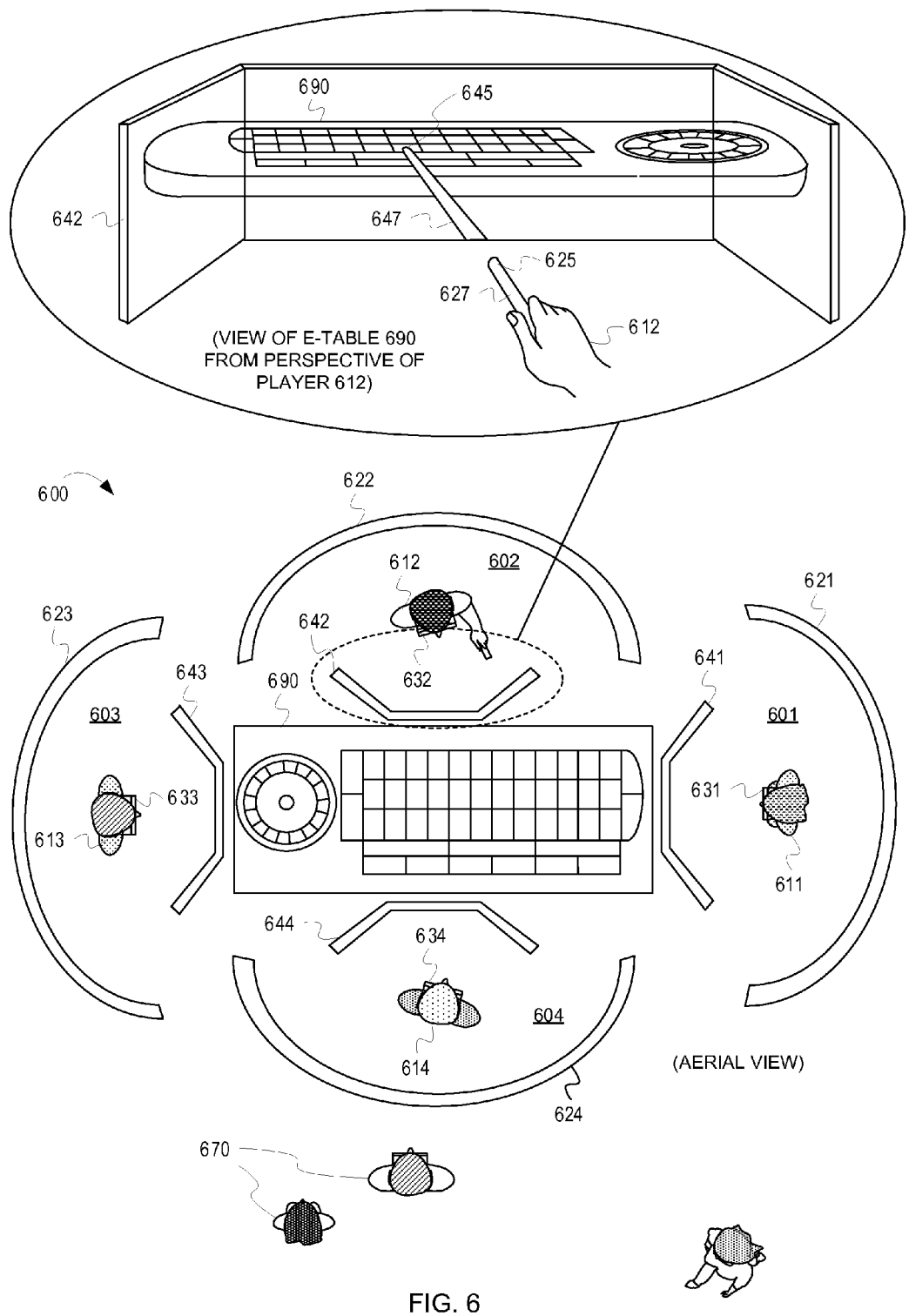
FIG. 6 is an illustration of integrating 3D wagering game elements in 2D gaming environments, according to some embodiments.

FIG. 3 is a flow diagram ("flow") 300 illustrating toggling between 3D and 2D mode in response to gaming conditions and player information and integrating 3D wagering game elements in 2D gaming environments, according to some embodiments. FIGS. 4, 5, and 6 are conceptual diagrams that help illustrate the flow of FIG. 3, according to some embodiments. This description will present FIG. 3 in concert with FIGS. 4, 5 and 6. In FIG. 3, the flow 300 begins at processing block 302, where a wagering game system ("system") detects a first indication to toggle a presentation of wagering game content from a 2D mode to a 3D mode. The indication to toggle the presentation may include, but not be limited to, a user-activated indicator (e.g., the 3D toggle button 105 in FIG. 1), an event that occurs as a result of wagering game play or programming, an activation of a device (e.g., activation of 3D glasses or a 3D viewer), detection of a player activity or characteristic (e.g., performance of a player in a wagering game, status of a player, etc.), environmental conditions (e.g., location or movement of a player, use of gaming devices, etc.) and so forth.

The flow 300 continues at processing block 304, where the system detects condition(s) that specify a degree of 3D presentation to enable during the 3D mode. For example, in FIG. 1, the system 100 detected a player status. The player status is an example of a condition that specifies the degree of 3D presentation. The degree of 3D presentation is the amount of wagering game elements to render in 3D. For instance, because the player's status was only eight out of a possible one hundred status point, the system 100 only renders gaming elements in one reel 108 in 3D. If the player had more status points, the system 100 could render a higher degree (e.g., number, amount, etc.) of the wagering game elements in 3D. For instance, if the player had 50 out of 100 status points, the system 100 might render all gaming elements in all of the reels 107, 108, and 109, in 3D. Other examples of conditions that may be used to specify a degree of 3D presentation may include, but not be limited to, a player history (e.g., an amount of wagers, an amount of playing time, etc.), a number of loyalty points, a number of social contacts referenced in a player's account, a number of people in a casino, a type of 3D viewer worn, an amount of network traffic, etc.

The flow 300 continues at processing block 306, where the system toggles the 3D mode and presents the wagering game content with the degree of 3D presentation according to the condition(s). For example, in FIG. 1, the system 100 presented only one reel 108 of wagering game elements based on the player's status. Another example of presenting wagering content with a degree of 3D presentation includes increasing a degree of parallax of a 3D effect, which increases a depth of the effect. Another example is presenting a degree of 3D animation. For instance, if the player had a higher number of status points (e.g., 80 status points) the system 100 may cause the 3D elements to become animated and move around a display (e.g., rotate on the display, leap outward, etc.) in 3D fashion.

In some embodiments, the system enables 3D mode for only a specific period of time, only for specific people, only for specific types of games, etc. In some embodiments, the system can detect a user activate condition which specifies a manual preference to shift to 3D mode, such as a press of a button, a touch on a screen, a tap with a device, etc. In some embodiments, the system can dynamically change concepts between 2D and 3D mode according to a variety of conditions. Below are a few examples:

In some embodiments, the system can dynamically change between 2D and 3D based on game programming. For example, the system can embed metadata tags or identifiers in wagering game content that indicate information about activity that is occurring during the presentation of the wagering game content. That tags may indicate specific actions that would normally extend outward toward a view in real life (e.g., a punch, an explosion, etc.). Based on the actions indicated in the tags, the wagering game content can automatically indicate to the system when to automatically toggle to a 3D mode. The system can present the portion of the content associated with a tag in 3D as long as the tag indicates the activity. When the wagering game content stops providing a tag that indicates the activity, the system can automatically switch back to a 2D mode (e.g., the system presents a portion of the wagering game content in 3D only until the tag goes away from the presentation of the content and disappears from the view of the display, which then causes the automatic toggle back to the 2D mode). Because the system can automatically, or dynamically, change between 2D and 3D modes, the system can also provide a prompt on a display to notify a player that the wagering game content will be using a 3D mode and to put on the 3D glasses, or enable other devices or implements necessary to view the 3D effects.

In some embodiments, the system can dynamically change between 2D and 3D based when a device is activated. For example, a sensor, an actuator, or other mechanism associated with 3D viewers can detect when the 3D viewer is turned on, put on, or otherwise put into use. The 3D viewer can send a signal to a display to switch to 3D mode. In some embodiments, the system can read a barcode mechanism placed on the 3D viewer. Thus, when a player puts on the 3D viewer, the system can read the barcode and tell the game to shift to 3D mode. Further, the barcode can be unique to a player, a machine, a player station at an e-table, a type of individual (e.g., player 1 versus player 2, a player versus an audience member, etc.), a type of 3D viewer (e.g., active versus passive viewers, 3D glasses versus an augmented reality viewer, etc.), and so forth. Based on the information, the system can customize presentation of the wagering game content in 3D. FIGS. 4 and 5 illustrate one example. In FIG. 4, a wagering game machine 460 includes a first display ("3D display") 403 that is enabled for 3D presentation and a second display ("2D display") 402 that is enabled for 2D presentation. The 3D display 403 and the 2D display 402 may be oriented in relation to each other to present a smooth transition between a 2D presentation of a bowling ball 405 into a 3D presentation of the bowling ball 405 as the bowling ball 405A moves along a virtual alley 404. The 3D display 403 may be primarily vertical compared to the position of the 2D display 402, which is primarily horizontal. The 3D display 403, however, may decline backward at an angle 425 that slants away from a viewer sufficient to provide a long perspective, allowing for a more pronounced 3D effect. The 3D display 403 and the 2D display 402 may further be configured so that a drop-off 410 exists between the two. One edge 413 of the 3D display drops below a face 422 of the 2D display 402 forming the drop-off 410. The face 422 is approximately parallel to a forward-facing perspective, or line of site 427, of a player that would be positioned in front of the wagering game machine 460. Further, the 2D display 402 may be frameless on one edge 412 such that active presentation elements (e.g. pixels 428) of the 2D display 402 run approximately to the edge 412 and appear to be a near seamless transition to active presentation elements (e.g., pixels 429) of the 3D display 403. The combination of the drop-off 410 and the frameless edge 412 presents an appearance of a seamless, or smooth transition between the face 422 of the 2D display 402 and a face 423 of the 3D display from a perspective of a player standing in front of the wagering game machine 460. Thus, the wagering game machine 460 can cause the bowling ball 405A to appear to transition across a seamless boundary 407 into the bowling ball 405B on the face 423 of the 3D display 403. A player can view the 3D display 403 with a passive 3D viewer, such as 3D glasses 430. When viewed through the 3D glasses 430, bowling pins 406 appear to fly outward and toward the view in a 3D perspective. Passive 3D viewers, however, do not cause the image of the bowling pins 406 to extend beyond a border 419 that separates the active presentation elements (e.g. pixels 429) of the 3D display 403 from a display frame. On the other hand, in FIG. 5, when the same wagering game machine 460 is displayed with an active 3D viewer or an augmented reality headset (e.g., using virtual reality goggles 530), the active 3D viewer can cause the presentation of the bowling pins 406 to extend beyond the border 419 of the 3D display 403. The system, therefore, can detect when a player is using either the 3D glasses 430 or the virtual reality goggles 530, and adjust the display of the bowling pins 460 accordingly. For instance, when a player is wearing the 3D glasses 430, the system presents all of the bowling pins 406 on the 3D display 403. When the player is wearing the virtual reality goggles 530, however, the system can present some or all of the bowling pins 406 within a display of the virtual reality goggles 530. The virtual reality goggles 530 can be connected wirelessly or with wires to the wagering game machine 460. In some embodiments, the system can also calculate, based on game physics, a number of the bowling pins 406 that have a projected trajectory that would send them flying toward the boundary 419. The system can then cause the images of the number of the bowling pins 406 that will touch the border 419 to appear to extend beyond the border 419, such as by rendering the number of bowling pins 460 entirely within the virtual reality goggles 530 from a moment that the bowling ball 405 strikes the bowling pins 406 or when the bowling pins 406 touch the border 419.

In some embodiments, the system can dynamically change between 2D and 3D based on player activity. In some examples, the system can detect a player's wagering game activity. For instance, if a player bets a certain amount, a player plays a specific amount of time, a player bets a specific combination of pay lines, etc., the system will automatically invoke 3D. In some embodiments, the system can notify players of what activities to perform to invoke the 3D. In other embodiments, the system can not notify players, providing a challenge for players to discover how to invoke the 3D. A player can specify, or override the dynamic changes using player settings, manual toggle buttons, etc. In another embodiment, the system can detect how a player manipulates a game object. For example, the system can detect how a player throws a bowling ball. If a player, for instance, imparts a curving bowl motion, etc., then the system can toggle to 3D mode to make the ball appear to veer into another lane of pins or into another player's pins on an adjacent wagering game machine.

In some embodiments, the system can dynamically change between 2D and 3D based on player characteristics. For instance, the system can detect and use a player's profile settings or status to modify 3D settings. In some embodiments, the system can read a barcode on a 3D viewer and connect to a player's account based on the information on the barcode. The system can read the player settings regarding 3D or player's status, then presents in 3D, or degrees/types of 3D quality, or degrees of gaming content, based on the player's settings or status.

In some embodiments, the system can dynamically change between 2D and 3D based on environmental conditions. For example, the system can determine a position that a player is situated in relation to a 3D display. For instance, the system can determine a given distance that a player is from the 3D display or determine an angle of view of a player of the 3D display. A 3D presentation can have a lower resolution than a 2D presentation on the same device (e.g., 3D resolution can be divided according to a number of views presented via the 3D imagery). As a result, if a player is standing too far away from, too close to, or at a sharp peripheral angle of view from a 3D display, the 3D effect may be distorted or unappealing to view. Consequently, in some embodiments, when a player moves out of range or shifts position to a specific degree, the system automatically switches back to a 2D mode. The system can track the player's position relative to a 3D display, for example, by tracking a player's facial movement and distance from a 3D display.

The flow 300 continues at processing block 308, where the system presents the wagering game content in 2D mode for audience members while simultaneously presenting the wagering game content in the 3D mode. In some embodiments, the system can include a canopy or layer behind a player that filters out one of the colors or polarized images of a 3D image so that the audience sees only a 2D mode. FIG. 6 illustrates an example. In FIG. 6, a wagering game system ("system") 600 includes an e-table 690 with various player stations 601, 602, 603 and 604 ("stations 601-604") where players 611, 612, 613 and 614 ("players 611-614") are stationed during game play. Each of the stations 601-604 can include a layer 621, 622, 623, and 624 ("layers 621-624") that can filter any 3D displays presented for the e-table 690 so that audience members 670 can view the action of the game play at the e-table 690 in 2D. Each of the player stations, however, can include station layers 641, 642, 643, and 644 ("layers 641-644") that can present 3D images overlapped, overlain, placed adjacent to, or otherwise integrated with presentation of 2D images of the e-table 690 and/or can filter portions of 3D images. The layers 641-644 are angled so that players can see an entire view of the e-table 690. Each of the players 611-614 may also wear one or more types of 3D viewers 631, 632, 633, and 634 ("3D viewers 631-634"), which may be passive viewers, active viewers, a combination, etc.

In some embodiments, the system 600 can present images at different refresh rates and, via use of the 3D viewers 631-634, and the layers 641-644, the system 600 can filter out some lines of pixels of a display for each player to see a custom 3D image. For example, the system 600 can present 3D wagering game content on a display 691 embedded into the top of the e-table. The display 691 is configured to have 480 Hz refresh rate. The system 600 can split the images of the 3D wagering game content into eight different 3D views, each presented at separate 60 Hz intervals of the 480 Hz refresh rate. Each of the eight 3D views corresponds to a separate one of each of the eyes for the players 611-614 (i.e., four players, with two eyes each=eight separate views). Each of the eight 3D views corresponds to either a left-eye or right-eye view for one of the players and two of each of the eight views correspond to any one of the player stations 601-604. The system 600 flickers 3D images of each of the eight views on and off at the 60 Hz intervals. The 3D viewers 611-614 or the layers 641-644 can be configured to simultaneously allow only the appropriate ones of the eight views that a player should see. The 3D viewers 611-614 or the layers 641-644 thus ensure that only appropriate images come through to the proper station 601-604. By doing this, for example, the system 600 can present "hidden" 3D images (e.g., a hidden key) that only some players can see, but that other players cannot see. To prevent one of the players from seeing all eight views of the 3D content on the display 691, the system 600 includes the layers 641-644, which are angled, so that a player's entire view of the e-table 690 must be viewed through their respective one of the layers 641-644.

In some embodiments, any of the players (e.g., player 612) can manipulate a hand-held device (e.g., a wand 627). The system 600 can track the orientation of the wand 627 (e.g., track a location or position of a tip 625 of the wand 627 via cameras, infrared beams, sensors, GPS, or other tracking mechanisms) in relation to the e-table 690. The wand 627 includes a dominant axis (e.g., the axis that extends along the length of the wand 627 from the base to the tip). The system 600 can present a 3D image (e.g., virtual wand 647) via the layer 642 that represents the wand 627 and that appears to extend toward the e-table 690. The system 600 causes the virtual wand 647 to appear to have an orientation equivalent to the orientation of the wand 627. In other words, the virtual wand 647 has the same dominant axis and the same orientation as the wand 627 and points parallel to the dominant axis of the wand 627. A tip 645 of the virtual wand 647 can intersect with a reference point on the e-table 690 (e.g., intersects with a point on the surface plane of the e-table 690). The wand 627 may include manual controls (e.g., buttons), or controls may exist on a player's console, chair, etc., associated with the player station 602 and which are synchronized with the wand 627. Because the tip 645 of the virtual wand 647 does not physically touch the e-table 690, the player 612 can manipulate the controls to verify that the intersection of the tip 645 of the virtual wand 647 is a desired point on the e-table 690 that the player 612 intended to point to or select.

The flow 300 continues at processing block 310, where the system detects a second indication to automatically toggle the presentation of wagering game content from 3D mode to 2D mode. For example, the system can track an orientation of 3D glasses to an angle or tilt of the player's head. Based on the orientation of the 3D glasses, the system can toggle 3D to 2D modes, and vice versa. For example, the system can scan only the portion of a gaming display that falls within a standard viewing angle of the human eyes. Based on an orientation of the 3D glasses, the system knows which portions of the gaming display fall within the standard viewing angle. Thus, if a player is not looking at a portion of the gaming display, the system can toggle 3D off for that portion. The system can utilize various mechanisms to determine positions, locations, orientations, etc. of 3D viewers, such as accelerometers, gyroscopes, global positioning sensors, infrared sensors, magnetic fields, video cameras, etc. For example, in FIG. 4, the 3D glasses 430 or the virtual reality goggles 530 in FIG. 5 can include tracking mechanism 431 and 531 built into the glasses. In some embodiments, the second indication may be a manual toggling of a control (e.g., pushing of the 3D toggle button 105). In some embodiments, the system can track when a player turns off a 3D mode and automatically update a player's profile settings regarding 3D preferences.

Figure 7:
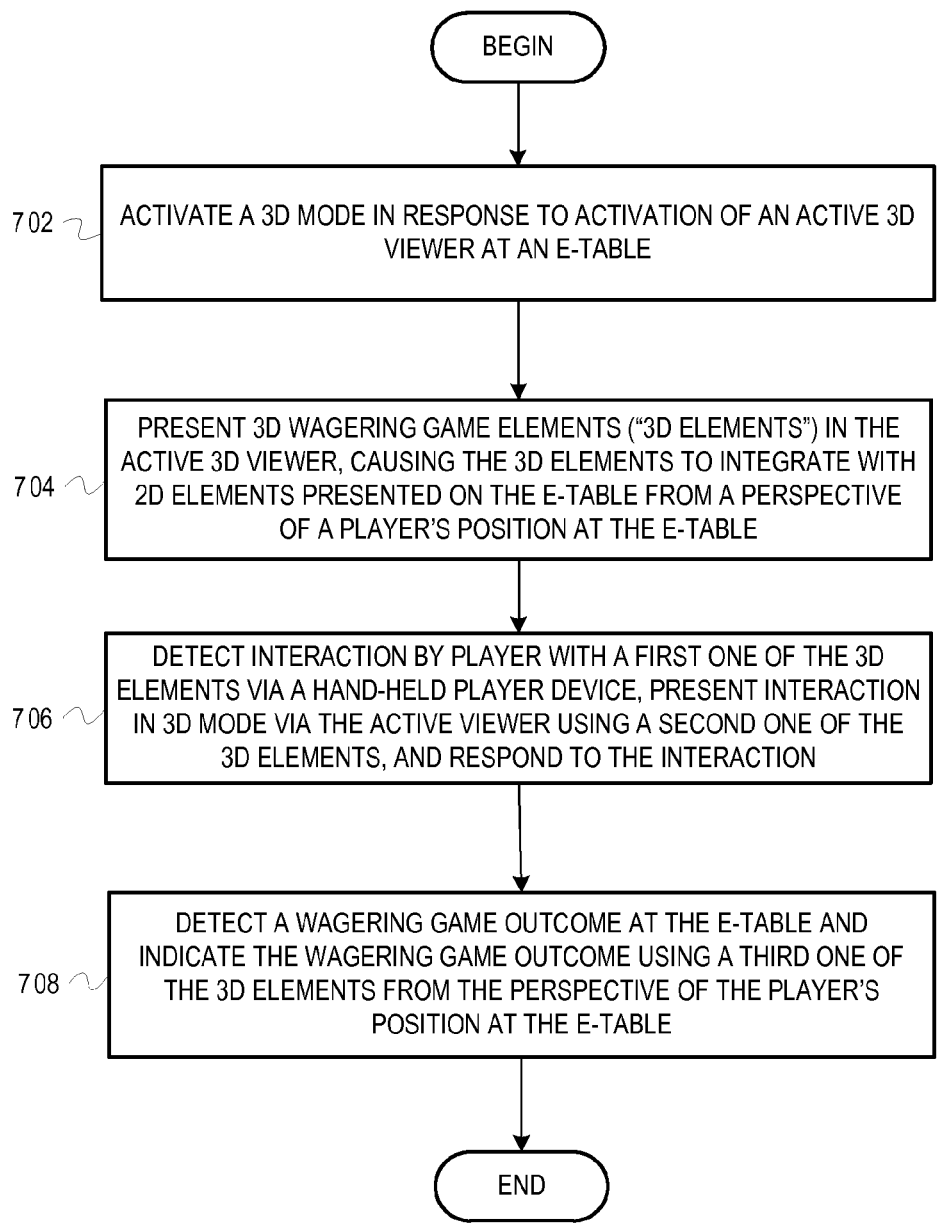
FIG. 7 is a flow diagram 700 illustrating integrating 3D wagering game elements with 2D elements of an electronic gaming table ("e-table") via active 3D viewers and handheld devices, according to some embodiments.
Figure 8:
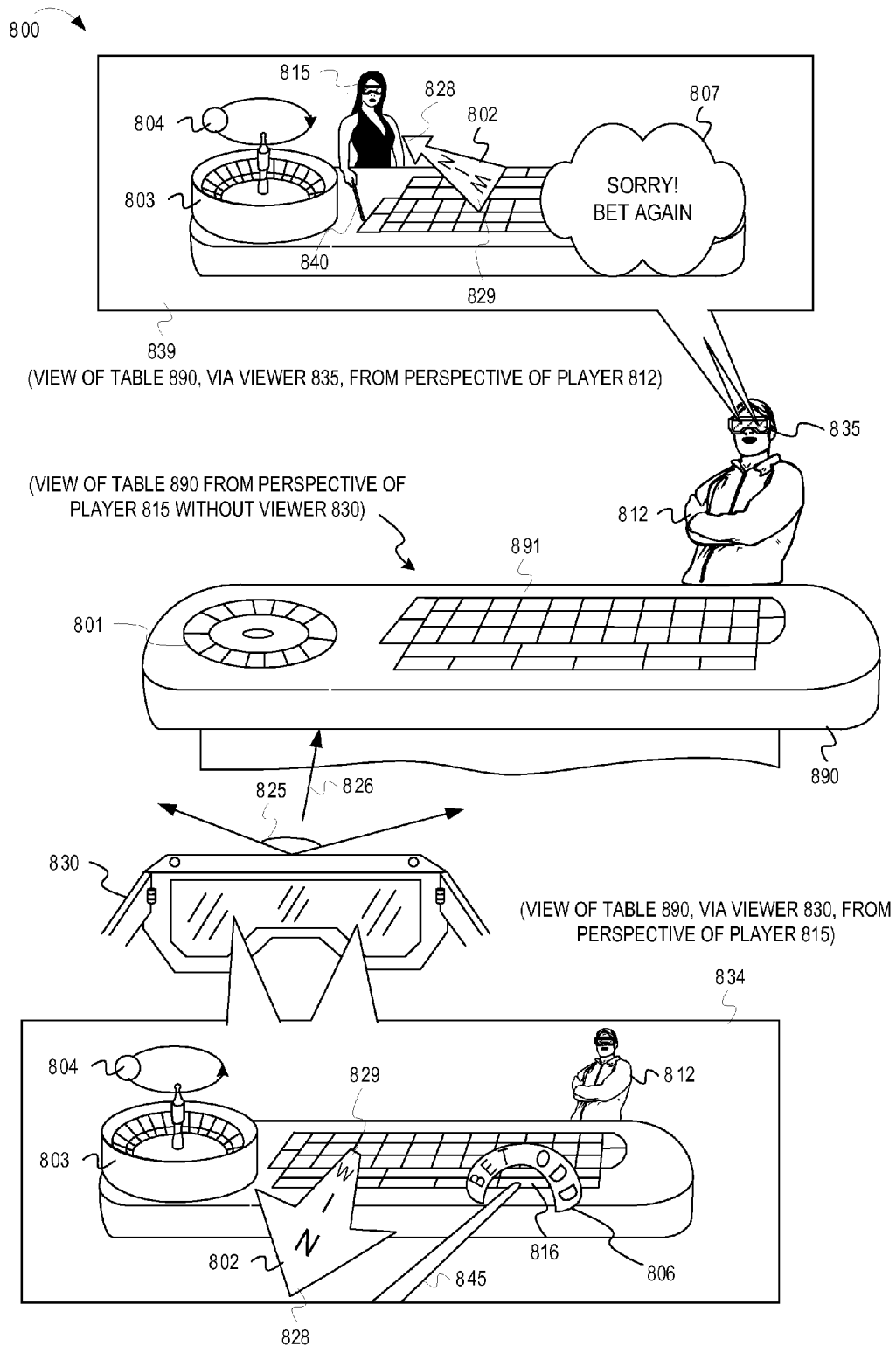
FIG. 8 is an illustration of integrating 3D wagering game elements with 2D elements of an e-table via active 3D viewers and handheld devices, according to some embodiments.
Figure 9:
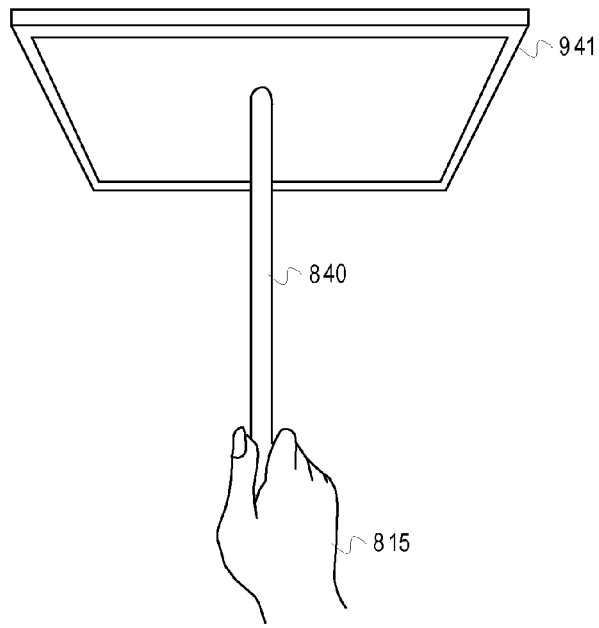
FIG. 9 is an illustration of integrating 3D wagering game elements with 2D elements of an e-table via active 3D viewers and handheld devices, according to some embodiments.
Figure 9:
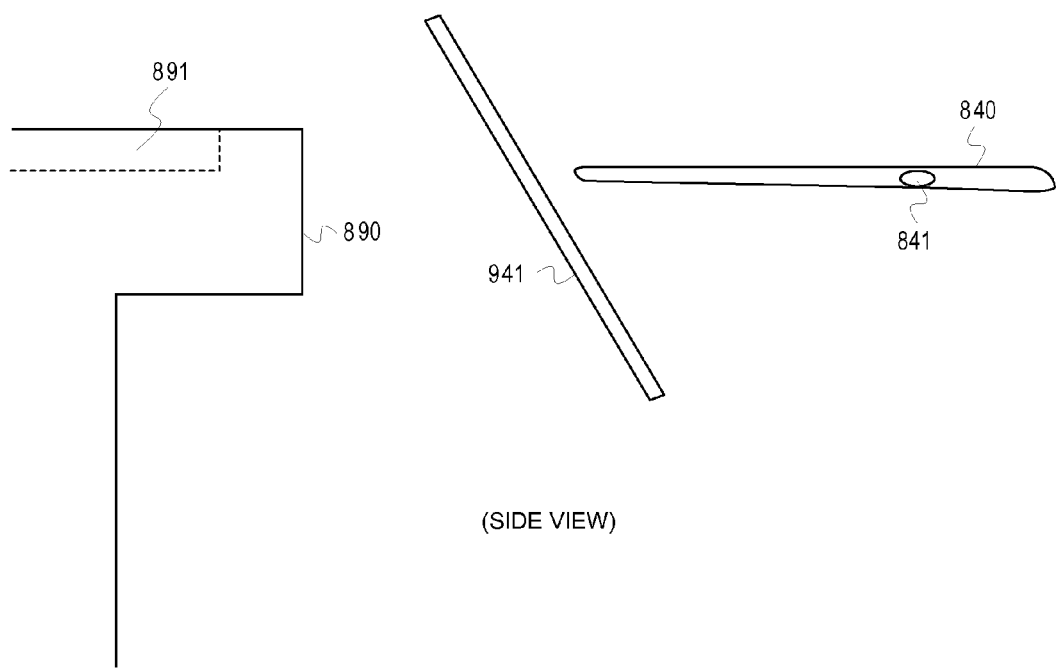

FIG. 7 is a flow diagram ("flow") 700 illustrating integrating 3D wagering game elements with 2D elements of an electronic gaming table ("e-table") via active 3D viewers and handheld devices, according to some embodiments. FIGS. 8 and 9 are conceptual diagrams that help illustrate the flow of FIG. 7, according to some embodiments. This description will present FIG. 7 in concert with FIGS. 8 and 9. In FIG. 7, the flow 700 begins at processing block 702 where a wagering game system ("system") activates a 3D mode in response to activation of an active 3D viewer at an e-table. For example, in FIG. 8, a wagering game system ("system") 800 includes an e-table 890 with a display 891. The display 891 can simultaneously present both 2D and 3D images related to group games or activities. For example, the system 800 can present 3D chips, 3D gaming elements, 3D images of player avatars, 3D characters of the game, etc. A first player 815 can use an active 3D viewer 830. The active 3D viewer 830 presets an active view 834 with a virtual 3-D heads up display in it. The active 3D viewer 830 also includes a transparency that allows viewing of the display 891, the table 890, and other players (e.g., player 812). The player 812 may also wear an active 3D viewer 835. The active 3D viewers 830 and 835 can also include ear-buds that insert into the respective player's ears. The system 800 can narrow-cast the audio to each of the players, thus providing a customized multi-media 3D presentation.

The flow 700 continues at processing block 704, where the system presents 3D wagering game elements ("3D elements") in the active 3D viewer, causing the 3D elements to integrate with 2D elements presented on the e-table from a perspective of a player's position at the e-table. The system can integrate 3D elements with 2D elements by simultaneously presenting the 2D and 3D elements on a display in a way that coincides with each other (e.g., overlaps, overlays, borders, surrounds, matches movement with, anchors to, interacts with, etc.). For example, referring to FIG. 8, the active 3D viewer 830 presents the active view 834 and the active 3D viewer 835 present an active view 839. The active views 834 and 839 present 3D images that appear to be superimposed over the display 891. Further, because each of the players 812 and 815 have a different perspective at the table 890, the active viewers 830 and 835 can present the 3D images from each player's perspective (e.g., present 3D images that appears to hover over the display 891, but each player sees a different perspective of the 3D images in their respective one of the active views 834 and 839). For instance, the player 815, via the active 3D viewer 830 sees a first perspective image of a 3D ball 804 that appears to float over a 3D roulette wheel 803 as the roulette wheel spins. At the same time the player 812 sees, via the active 3D viewer 835, a different perspective image of the 3D ball 804 and the 3D roulette wheel 803 from the second player's position at the e-table 890. The perspective that the player 812 sees is reversed from the perspective that the player 815 sees because they are on opposite sides of the e-table 890. The system 800 can track a viewing perspective (e.g. a line of sight 826, a viewing angle 825, etc.) of the a player (e.g., player 815) in relation to the display 891 and, based on the viewing perspective, the system can cause three-dimensional images (e.g., the 3D ball 804, the 3D roulette wheel 803) appear to maintain an overlaid position in relation to a 2D image 801 on the display 891. Thus, when the player 815 moves her head, and, consequently causes the active view 834 to shift, the system 800 can cause the 3D images (e.g., the 3D ball 804 and the 3D roulette wheel 803) to appear to remain affixed, within the active view 834, to a position of the 2D image 801 of the roulette wheel presented on the display 891.

The flow 700 continues at processing block 706 where the system detects interaction by a player with a first one of the 3D elements via a hand-held player device, presents interaction in a 3D mode via the active viewer using a second one of the 3D elements, and responds to the interaction. For example, in FIG. 8, the system 800 can recognize a gestural motion or movement of a device (e.g., a wand 840) held by the player 815. Based on the position of the wand 840, the system 800 can project a 3D image 845 of the wand 840 for view within the active view 834 of the active 3D viewer 830. For example, the 3D image 845 is a representation of the wand 840 that appears to extend into the active view 834 in a three-dimensional way (e.g., stereoscopically, with an extended perspective, with 3D animated effects such as shading, etc.), and interacts with an e-table element 816, (e.g., to place a bet). In one example, the system 800 can project the 3D image 845 of the wand 840 similarly as described in FIG. 6, such that the system 800 projects the 3D image of the wand 840 parallel to a dominant axis to determine intersection with a reference plane, point, etc. of the e-table 890 or display 891. In some embodiments, such as in FIG. 9, the wand 840 can interact with a touchpad 941 instead of touching the display 891 on the e-table 890. The touchpad 941 is close to the player 815 and can provide a tactile response to interaction with any 3D imagery viewed through the active 3D viewer 830. The touchpad 941 is configured to detect touch from, or proximity of, the wand 840. The wand 840 can also include an activator 841 that can be used to verify activities performed by the player (e.g., to verify a placement of a wager). For example, when the wand 840 appears to touch the e-table element 816, the touchpad 941 provides a tactile sensation of the wand 840 touching the e-table element 816. Further, the active 3D viewer 830 may present a 3D element 806 that indicates details about the e-table element 816. The player can touch the 3D element 806 of activate the activator 841 on the wand to verify that the player wishes to place a bet on the e-table element 816.

In some embodiments, the system 800 can coordinate movement of a handheld device (e.g., the wand 840) with a 3D display (e.g., the active 3D viewer 830, one of the layers 641-644 of FIG. 6). For example, the system 800 can cause the active view 834 to pan when the player moves the wand 840 left, right, up, or down, so that a player can see different views of the 3D content peripheral to the e-table 840.

The flow 700 continues at processing block 708 where the system detects a wagering game outcome at the e-table and indicates the wagering game outcome using a third one of the 3D elements from the perspective of the player's position at the e-table. For example, in FIG. 8, a 3D image (a 3D arrow 802, a virtual character, etc.) indicates (e.g., points to) a player that wins (e.g., player 815). The system 800 knows where the player 815 is located by tracking mechanisms in the active 3D viewer 830. The system can track an identifier of the active 3D viewer 830 and associate the identifier with the player 815 so that there is no mistake about which player the 3D arrow 802 is indicating. Further, system 800 can make every player's perspective of the 3D arrow 802 to appear from the perspective of the respective player (i.e., to make the 3D arrow 802 look like it is pointing only at the player 815). For instance, from the perspective of the player 815, a tip 828 of the 3D arrow 802 points toward the position of the player 815. The tip 828 appears large compared to a tail 829 of the 3D arrow 302 from the perspective of the player 815. Meanwhile, from a perspective of the player 812, via the active 3D viewer 835, the system 800 modifies a stereoscopic view of the 3D arrow 802 so that the tip 828 appears to be pointing away from the player 812 and the tip 828 appears much smaller than the tail 829, thus indicating an exaggerated view that the 3D arrow 802 is pointing toward the player 815 and not the player 812. Further, if the player 812 has lost, the system 800 may present a 3D graphic 807 that indicates to only the player 812 that he lost.

Further it should be noted that although some embodiments described above mention the use of 3D viewers (e.g., 3D glasses 430, virtual reality goggles 530, active viewer 830, etc.), 3D viewers are only one way of presenting 3D content. Other embodiments may utilize holography or other techniques, instead of, in addition to, in conjunction with, etc., the 3D viewers. Holograms (e.g., static holograms, dynamic holograms, etc.), for example, can be used to show 3D content at many radial viewing positions, such as for showing different perspective of 3D content around the e-table 690 and/or the e-table 890.

Additional Example Operating Environments

This section describes example operating environments, systems and networks, and presents structural aspects of some embodiments.

Wagering Game Machine Architecture

Figure 10:
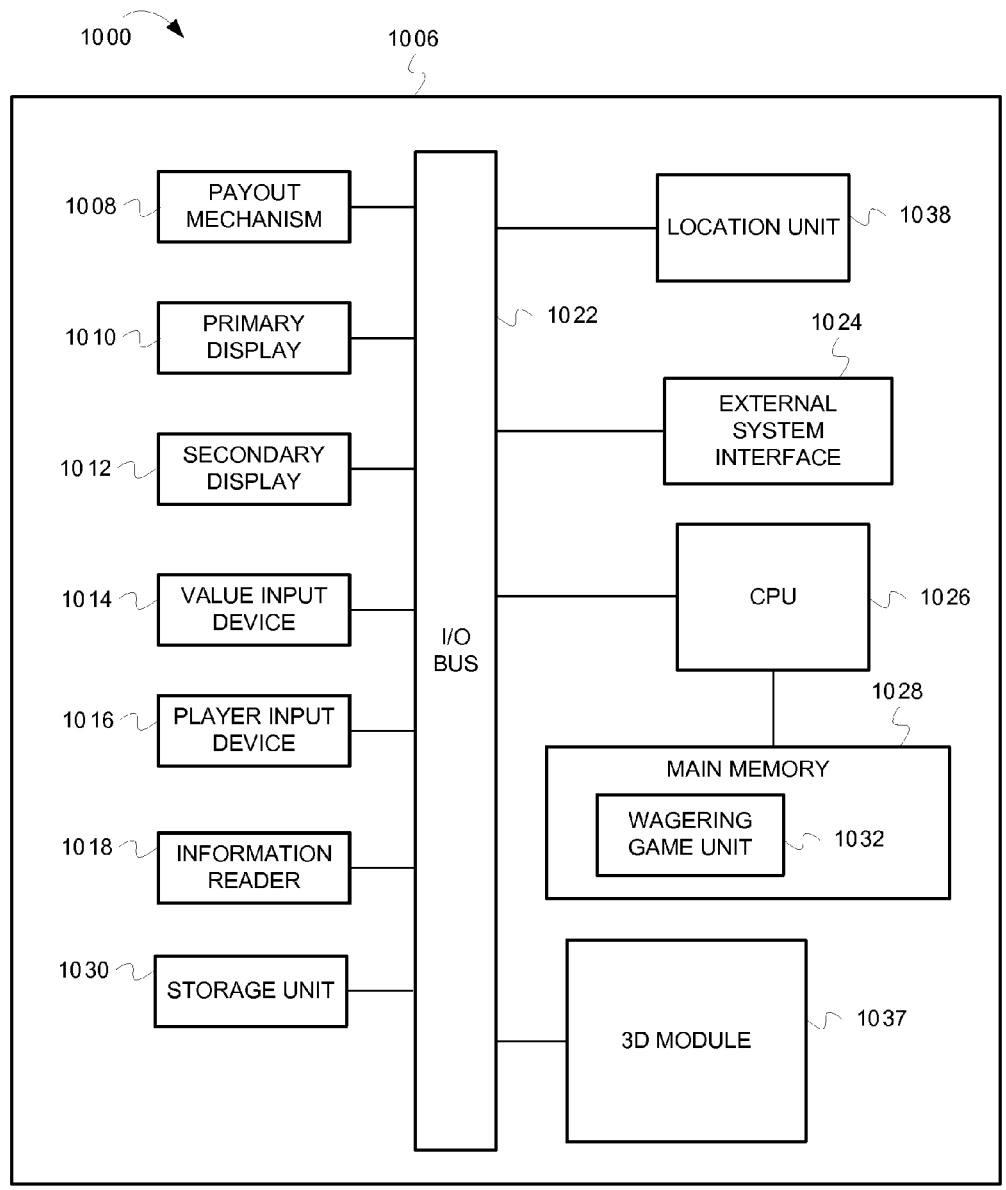
FIG. 10 is an illustration of a wagering game machine architecture 1000, according to some embodiments.

FIG. 10 is a conceptual diagram that illustrates an example of a wagering game machine architecture 1000, according to some embodiments. In FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032. In some embodiments, the wagering game unit 1032 can present wagering games, such as video poker, video black jack, video slots, video lottery, reel slots, etc., in whole or part.

The CPU 1026 is also connected to an input/output ("I/O") bus 1022, which can include any suitable bus technologies, such as an AGTL+ frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems (e.g., wagering game networks). The external system interface 1024 can include logic for exchanging information over wired and wireless networks (e.g., 802.11g transceiver, Bluetooth transceiver, Ethernet transceiver, etc.)

The I/O bus 1022 is also connected to a location unit 1038. The location unit 1038 can create player information that indicates the wagering game machine's location/movements in a casino. In some embodiments, the location unit 1038 includes a global positioning system (GPS) receiver that can determine the wagering game machine's location using GPS satellites. In other embodiments, the location unit 1038 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 10, in some embodiments, the location unit 1038 is not connected to the I/O bus 1022.

In some embodiments, the wagering game machine 1006 can include additional peripheral devices and/or more than one of each component shown in FIG. 10. For example, in some embodiments, the wagering game machine 1006 can include multiple external system interfaces 1024 and/or multiple CPUs 1026. In some embodiments, any of the components can be integrated or subdivided.

In some embodiments, the wagering game machine 1006 includes a 3D module 1037. The 3D module 1037 can process communications, commands, or other information, where the processing can integrate three-dimensional elements into two-dimensional gaming environments.

Furthermore, any component of the wagering game machine 1006 can include hardware, firmware, and/or machine-readable storage media including instructions for performing the operations described herein.

Wagering Game Machine

Figure 11:
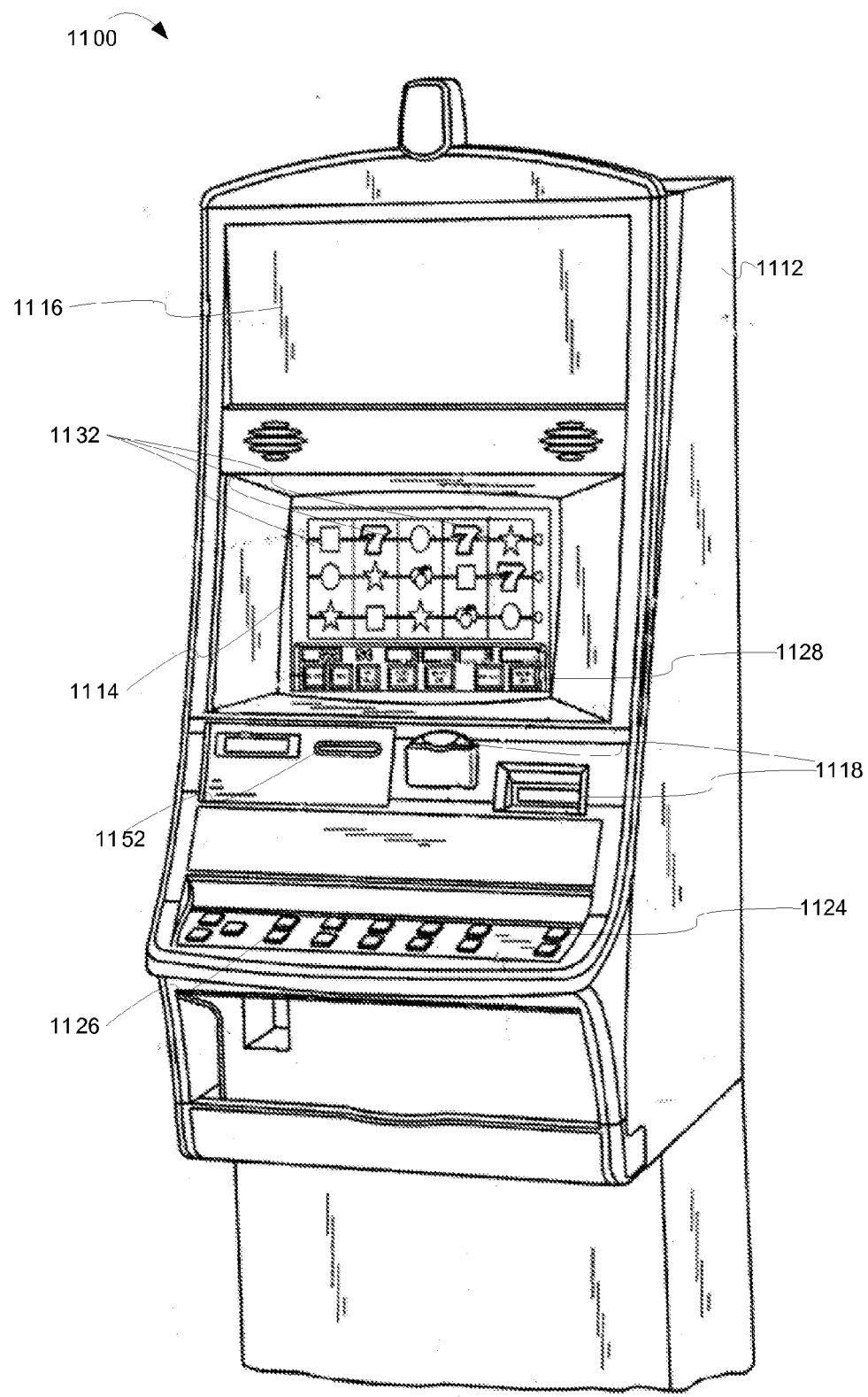
FIG. 11 is an illustration of a wagering game machine 1100, according to some embodiments.

FIG. 11 is a conceptual diagram that illustrates an example of a wagering game machine 1100, according to some embodiments. Referring to FIG. 11, the wagering game machine 1100 can be used in gaming establishments, such as casinos. According to some embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bar top model, mobile handheld model, or workstation console model.

A player begins playing a basic wagering game by making a wager via the value input device 1118. The player can initiate play by using the player input device's buttons or touch screen 1128. The basic game can include arranging a plurality of symbols 1132 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface. In some embodiments, the information reader 1152 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system configured to present first wagering game content for a casino wagering game, said method comprising:
presenting the first wagering game content for the casino wagering game to have a two-dimensional appearance via an autostereoscopic display device of the gaming system, wherein the two-dimensional appearance is without stereoscopic depth;
detecting a game condition for the casino wagering game based on an indication to change a presentation of the two-dimensional appearance to have a stereoscopic three-dimensional appearance having stereoscopic depth, wherein the game condition is other than a location of a player of the casino wagering game;
determining a degree of stereoscopic three-dimensional depth to use for the first wagering game content based on a value for the game condition;
changing the presentation of the two-dimensional appearance to the stereoscopic three-dimensional appearance in response to the determining the degree of stereoscopic three-dimensional depth to use; and
presenting, via the autostereoscopic display device, the first wagering game content with the degree of stereoscopic three-dimensional depth proportional to the value for the game condition.

2. The method of claim 1, wherein the game condition comprises one or more of a game value of the casino wagering game, wagering performed in the casino wagering game, a game history of the casino wagering game, a player activity associated with the casino wagering game, a time the casino wagering game has been played, or a player status of a wagering game player account logged into the gaming system.

3. The method of claim 1, wherein the game condition comprises one or more of a number of people in a casino, an amount of network traffic in a casino, a number of loyalty points of a customer loyalty account, or a number of social contacts referenced in a player account.

4. The method of claim 1, wherein the detecting the game condition for the casino wagering game comprises detecting a change in the game condition, and wherein the presenting the first wagering game content with the degree of stereoscopic three-dimensional depth proportional to the value for the game condition comprises presenting the first wagering game content with the degree of stereoscopic three-dimensional depth proportional to a value for a degree of the change in the game condition.

5. The method of claim 4, wherein detecting the change in the game condition comprises detecting one or more of a change in a game value of the casino wagering game, a change in wagering performed in the casino wagering game, a change in a game history of the casino wagering game, a change in player activity associated with the casino wagering game, a change in time the casino wagering game has been played, or a change in player status of a wagering game player account logged into the gaming system.

6. The method of claim 1, wherein the degree of stereoscopic three-dimensional depth comprises at least one of a plurality of non-zero depth values.

7. The method of claim 1 further comprising:
detecting an increase to an amount of the game condition; and
automatically increasing the degree of stereoscopic three-dimensional depth according to the increase to the amount of the game condition.

8. The method of claim 1 further comprising:
presenting, via the gaming system, second wagering game content for the casino wagering game via the autostereoscopic display device, the second wagering game content having a two-dimensional appearance simultaneous with the presenting the first wagering game content with the stereoscopic three-dimensional appearance.

9. The method of claim 1, wherein the value for the game condition comprises one or more of an amount of movement of a game play element depicted in the casino wagering game or an amount of a position of a wagering game symbol depicted in the casino wagering game.

10. One or more non-transitory, machine-readable storage media having instructions stored thereon, which when executed by a processor of a gaming system cause the gaming system to perform operations comprising:
presenting wagering game content for a casino wagering game to have a two-dimensional appearance via an autostereoscopic display device of the gaming system, wherein the two-dimensional appearance is without stereoscopic depth;
detecting a game condition for the casino wagering game based on an indication to change a presentation of the two-dimensional appearance to have a stereoscopic three-dimensional appearance having stereoscopic depth, wherein the game condition comprises one or more of a game value of the casino wagering game, wagering performed in the casino wagering game, a game history of the casino wagering game, a time the casino wagering game has been played, a player status of a wagering game player account logged into the gaming system, a number of people in a casino, an amount of network traffic in a casino, a number of loyalty points of a customer loyalty account, a number of social contacts referenced in a player account, an amount of movement of a game play element depicted in the casino wagering game, or a position of a wagering game symbol depicted in the casino wagering game;

determining a degree of stereoscopic three-dimensional depth to use for the wagering game content based on a value for the game condition;

changing the presentation of the two-dimensional appearance to the stereoscopic three-dimensional appearance in response to the determining the degree of stereoscopic three-dimensional depth to use; and presenting, via the autostereoscopic display device, the wagering game content with the degree of stereoscopic three-dimensional depth proportional to the value for the game condition.

11. The one or more non-transitory, machine-readable storage media of claim 10, wherein the operations for detecting the game condition for the casino wagering game includes operations comprising detecting a change in the game condition, and wherein the operations for presenting the wagering game content with the degree of stereoscopic three-dimensional depth proportional to the value for the game condition includes operations comprising presenting the wagering game content with the degree of stereoscopic three-dimensional depth proportional to a value for a degree of the change in the game condition.

12. The one or more non-transitory, machine-readable storage media of claim 10, wherein the degree of stereoscopic three-dimensional depth comprises at least one of a plurality of non-zero depth values configured for use in rendering stereoscopic images of the wagering game content.

13. A gaming system comprising:
a processor;
an autostereoscopic display device;
a value input device configured to receive monetary value for placement of one or more wagers in a casino wagering game; and
a memory storage device configured to store instructions, which when executed by the processor cause the gaming system to perform operations to present first wagering game content for the casino wagering game to have a two-dimensional appearance via the autostereoscopic display device, determine a game condition for the casino wagering game in response to an indication to change a presentation of the two-dimensional appearance without stereoscopic depth to have a stereoscopic three-dimensional appearance having stereoscopic depth,
determine a degree of stereoscopic three-dimensional depth to use for the first wagering game content proportional to a value for the game condition,
change the presentation of the two-dimensional appearance to the stereoscopic three-dimensional appearance in response to determination of the degree of stereoscopic three-dimensional depth to use,
present, via the autostereoscopic display device, the first wagering game content with the degree of stereoscopic three-dimensional depth, and
present, via the autostereoscopic display device of the gaming system, second wagering game content for the casino wagering game having a two-dimensional appearance simultaneous with presentation of the first wagering game content having the stereoscopic three-dimensional appearance.

14. The gaming system of claim 13, wherein the memory storage device is configured to store instructions, which when executed by the processor cause the gaming system to perform operations to:
detect an increase to an amount of the game condition; and
automatically increase the degree of stereoscopic three-dimensional depth according to the increase to the amount of the game condition.

15. The gaming system of claim 13, wherein the value for the game condition comprises one or more of an amount of movement of a game play element depicted in the casino wagering game or an amount of a position of a wagering game symbol depicted in the casino wagering game.

16. The gaming system of claim 13, wherein the memory storage device is configured to store instructions, which when executed by the processor cause the gaming system to perform operations to:
analyze movement of a user-adjustable device associated with the gaming system, wherein the user-adjustable device is configured to be oriented in a plurality of positions; and
determine, based on analysis of the movement, the degree of stereoscopic three-dimensional depth to present for the first wagering game content proportional to orientation of the user-adjustable device.

17. A method of operating a gaming system configured to present wagering game content for a casino wagering game, said method comprising:
presenting the wagering game content for the casino wagering game to have a two-dimensional appearance via an autostereoscopic display device of the gaming system, wherein the two-dimensional appearance is without stereoscopic depth;
analyzing movement of a user-adjustable device associated with the gaming system, wherein the user-adjustable device is configured to be oriented in a plurality of positions;
detecting, based on analysis of the movement of the user-adjustable device, a degree of stereoscopic three-dimensional depth to present for the wagering game content proportional to orientation of the user-adjustable device based on an indication to change a presentation of the two-dimensional appearance to have a stereoscopic three-dimensional appearance having stereoscopic depth;
changing the presentation of the two-dimensional appearance to the stereoscopic three-dimensional appearance in response to the detecting the degree of stereoscopic three-dimensional depth to the present for the wagering game content; and
presenting, via the autostereoscopic display device, the wagering game content with the degree of stereoscopic three-dimensional depth proportional to the orientation of the user-adjustable device.

18. A gaming system comprising:
a processor;
an autostereoscopic display device; and a memory storage device configured to store instructions, which when executed by the processor cause the gaming system to perform operations to cause a first presentation of wagering game content for a casino wagering game via the autostereoscopic display device, wherein the first presentation of the wagering game content has a two-dimensional appearance without stereoscopic depth, detect a game condition for the casino wagering game based on an indication to change the first presentation of the wagering game content to a second presentation of the wagering game content having a stereoscopic three-dimensional appearance with stereoscopic depth, wherein the game condition comprises one or more of a game value of the casino wagering game, wagering performed in the casino wagering game, a game history of the casino wagering game, a time the casino wagering game has been played, a player status of a wagering game player account logged into the gaming system, a number of people in a casino, an amount of network traffic in a casino, a number of loyalty points of a customer loyalty account, a number of social contacts referenced in a player account, an amount of movement of a game play element depicted in the casino wagering game, or a position of a wagering game symbol depicted in the casino wagering game, determine a degree of stereoscopic three-dimensional depth to use for the wagering game content proportional to a value for the game condition, and cause, via the autostereoscopic display device, the second presentation of the wagering game content using the degree of stereoscopic three-dimensional depth.

19. A non-transitory, machine-readable storage medium having instructions stored thereon, which when executed by a set of one or more processors of a gaming system cause the gaming system to perform operations comprising:

presenting first wagering game content for a casino wagering game via an autostereoscopic display device, wherein the first wagering game content is presented to have a two-dimensional appearance without stereoscopic depth;

detecting a game condition for the casino wagering game based on an indication to change a presentation of the first wagering game content from the two-dimensional appearance to a stereoscopic three-dimensional appearance having stereoscopic depth;

determining a degree of stereoscopic three-dimensional depth to use for the first wagering game content proportional to a value for the game condition;

changing, in response to the determining the degree of stereoscopic three-dimensional depth to use, the presentation of the first wagering game content from the two-dimensional appearance to the stereoscopic three-dimensional appearance, wherein the stereoscopic three-dimensional appearance uses the degree of stereoscopic three-dimensional depth; and presenting, via the autostereoscopic display device, second wagering game content for the casino wagering game having a two-dimensional appearance simultaneous with presentation of the first wagering game content with the stereoscopic three-dimensional appearance.

20. A method of operating a gaming system, said method comprising:

presenting wagering game content for a casino wagering game via an autostereoscopic display device of the gaming system, wherein the wagering game content is presented with a two-dimensional appearance without stereoscopic depth;

detecting a game condition for the casino wagering game based on an indication to change a presentation of the wagering game content from the two-dimensional appearance to a stereoscopic three-dimensional appearance having stereoscopic depth;

determining a degree of stereoscopic three-dimensional depth to use for the wagering game content proportional to a value for the game condition, wherein the value for the game condition comprises one or more of a game value of the casino wagering game, wagering performed in the casino wagering game, a game history of the casino wagering game, a time the casino wagering game has been played, a player status of a wagering game player account logged into the gaming system, a number of people in a casino, an amount of network traffic in a casino, a number of loyalty points of a customer loyalty account, a number of social contacts referenced in a player account, an amount of movement of a game play element depicted in the casino wagering game, or a position of a wagering game symbol depicted in the casino wagering game; and changing the presentation of the wagering game content from the two-dimensional appearance to the stereoscopic three-dimensional appearance, wherein the stereoscopic three-dimensional appearance uses the degree of stereoscopic three-dimensional depth.

21. A gaming system comprising:

a processor; and a memory storage device configured to store instructions, which when executed by the processor cause the gaming system to perform operations to present wagering game content for a casino wagering game via an autostereoscopic display device, wherein the wagering game content is presented with a two-dimensional appearance having no stereoscopic depth, determine a value for a game condition for the casino wagering game based on an indication to change a presentation of the wagering game content from the two-dimensional appearance to a stereoscopic three-dimensional appearance having stereoscopic depth, wherein the game condition is other than a location of a player of the casino wagering game, determine a degree of stereoscopic three-dimensional depth that is based proportionally on the value for the game condition, and change the presentation of the wagering game content from the two-dimensional appearance to the stereoscopic three-dimensional appearance, wherein the stereoscopic three-dimensional appearance uses the degree of stereoscopic three-dimensional depth.

22. A gaming system comprising:

one or more processors; and one or more memory storage devices configured to store instructions, which when executed by at least one of the one or more processors cause the gaming system to perform operations to cause a first presentation of wagering game content for a casino wagering game via an autostereoscopic display device, wherein the first presentation of the wagering game content is presented with an appearance that has no stereoscopic depth, analyze movement of a user-adjustable device associated with the gaming system, wherein the user-adjustable device is configured to be oriented in a plurality of positions, wherein the movement of the user-adjustable device triggers a change in presentation of the wagering game content from the first presentation to a second presentation with an appearance that has a stereoscopic depth, determine, based on analysis of the movement of the user-adjustable device between the plurality of positions, a degree of stereoscopic three-dimensional depth effect to use for the second presentation of the wagering game content, wherein the degree of stereoscopic three-dimensional depth effect is proportional to one or more of the movement or an orientation of the user-adjustable device, and cause the second presentation of the wagering game content to use the degree of stereoscopic three-dimensional depth effect.

\* \* \* \* \*